UNITED STATES PATENT OFFICE.

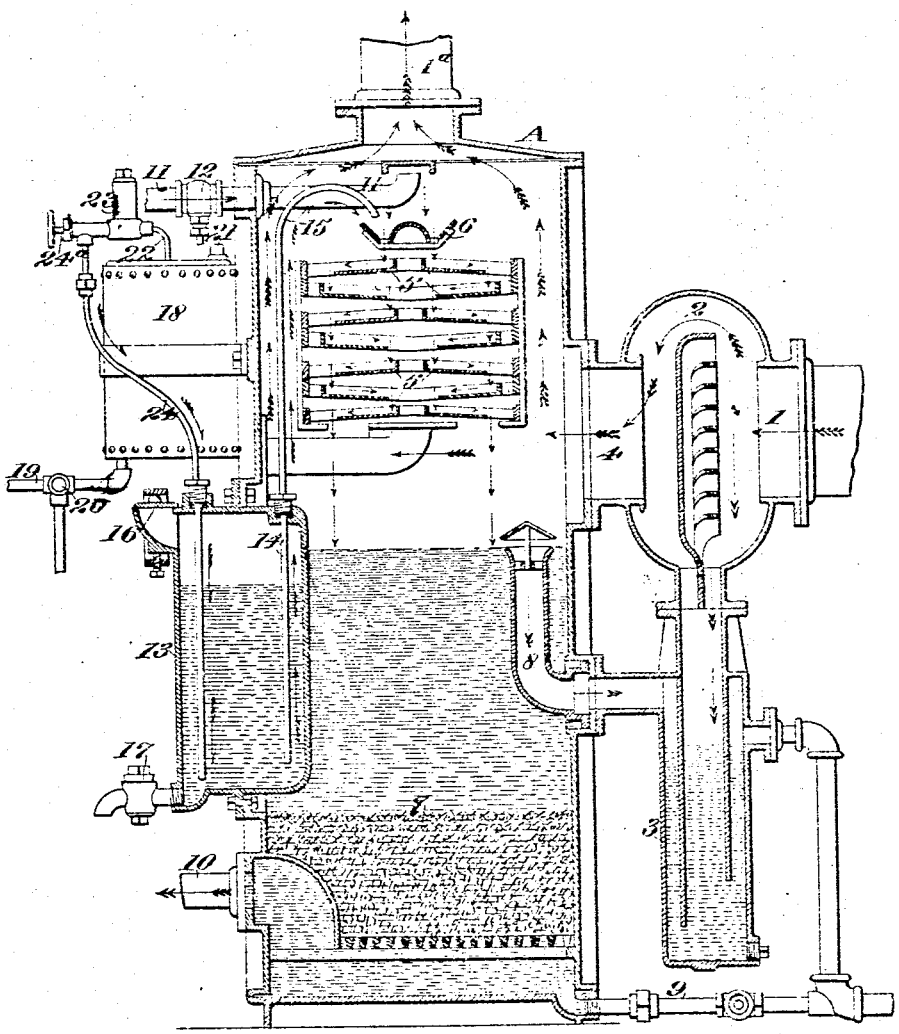

JOHN E. ANGELL, OF ST. LOUIS, MISSOURI.

PROCESS OF PURIFYING WATER.

965,148.
Specification of Letters Patent.
Patented July 26, 1910.

Original application filed April 27, 1906, Serial No. 314,068. Divided and this application filed February 26, 1907. Serial No. 359,352.

*To all whom it may concern:*

Be it known that I, JOHN E. ANGELL, a citizen of the United States, residing at St. Louis, Missouri, have invented a new and useful Process of Purifying Water, of which the following is a specification.

This invention relates to processes for clarifying and purifying water, and it consists of the novel features and essential steps hereinafter described and then particularly pointed out in the claims.

This application is divisional and a continuation of my former application for patent for a water purifier and clarifier, filed April 27, 1906, Serial No. 314,068, and comprises the process of purifying and clarifying water by the apparatus in said application disclosed and claimed, or by mechanisms involving the same or equivalent operations to attain the same results.

The process consists, broadly, in mixing a stream of water to be purified with a supply of some heated reagent, within a heater tank; and it involves the preparation of the reagent under the influence of the heat within the purifier, and the introduction or ejection of the reagent into the incoming water, and their thorough commingling and mixture. It also involves the agitation of the reagent to prevent crystallization and sedimentation thereof and the utilization of the agitating agent to eject or supply the reagent into the water supply.

To accomplish these steps and purposes I have found the apparatus described in my application above referred to to be highly efficient. It is obvious, however, that other species of apparatus may be utilized to practice this invention, for which reason the claims for the process could not be allowed in the same application with the claims for the apparatus, necessitating the filing of separate applications, one for the process and one for the apparatus. This application, therefore, is in continuation of my said former application, and is for the process of purifying and clarifying water by the process disclosed in said application, whether by the specific means therein disclosed or by other means.

For convenience, and to simply cross-reference between the two applications, I have shown in the accompanying drawing the same embodiment of mechanism for practicing the invention that is disclosed in the co-pending application above identified, said embodiment being in a heater known as an "open heater." In the description of the process reference will be made to the apparatus, the construction and arrangement of which are fully described.

In the apparatus illustrated for the practice of the invention A indicates a feed-water heater into which steam is admitted through a pipe 1, a steam and oil separator 2, and a connecting passage 4. A trap 3 is arranged in connection with the separator to receive and discharge the separated oil and water. A pipe $1^a$ serves as an outlet for the steam from the heater.

Within the heater A are a multiplicity of trays 5 arranged in the path of the passing steam so that they are kept at the same temperature as the steam. A distributing trough 6 is mounted above the trays 5 to receive the water charged with the reagent and cause mixture and distribution thereof on the trays whence it flows and is eventually deposited in heated condition upon a filter bed 7 in the bottom of the heater. It will be observed that the steam is free to circulate between and around the pans 5 so that the water will be raised to the temperature, substantially, of the steam. An overflow pipe 8 leads from the trap 3 into the heater and is provided with an open upper end, thereby determining the altitude to which the water in the heater may rise. The filter bed 7 is arranged some distance above the bottom of the heater, thereby forming a chamber which receives the purified water which percolates through the filter bed. A pipe 10 leads from the purified water chamber to the boiler or other destination. A valve controlled pipe 9 leads from the bottom of the purified water chamber and affords convenient means for drawing off any amount of water as desired.

A feed-water pipe 11 leads into the heater near the top and terminates immediately above the distributing trough 6 into which the water is discharged. A valve 12 is located at a convenient position on the pipe 11 and affords means to regulate the amount of water admitted into the heater. The pipe 11 discharges the water near the outlet pipe $1^a$ into the heated trough 6 from which it flows, exposed to the steam, onto the trays 5 against, between, and around which the steam circulates as it passes toward the outlet.

13 indicates the chemical reagent tank which is located in an opening of the wall of the heater, and which extends a considerable distance into the heater and being, for the most part, below the maximum water level, so that the contents of the tank will be kept hot at about the same temperature as the heated water. This condition most effectively thwarts the tendency of the reagent to crystallize. A feed pipe 14 extends from a point near the bottom of the tank through the top thereof into the heater A and is provided with a lateral extension 15 on its upper end which delivers the chemical reagent into the distributing trough 6 where it combines and is mixed with the feed-water. An opening is provided whereby the reagent may be introduced into the tank, said opening being provided with suitable means 16 for closing the same.

Any preferred reagent may be utilized in this apparatus, and if the powdered form is used a sufficient quantity or current of water to dissolve it is mixed therewith simultaneously with its application into the tank 13 and its exposure to the heat in the heater, the water and reagent being supplied through the opening at 16.

A valve 17 communicates with the bottom of the tank 13 and may be used to draw off all the contents for the purpose of cleaning the tank or other purposes.

A pressure tank 18 is secured in some suitable manner to the heater A. A charging or pressure supply pipe 19 leads into the tank 18. A valve 20 is located at a convenient position in said pipe, and is operable to admit or discharge the pressure, or to prevent admission thereof into the tank. A check valve 21, of ordinary construction, is arranged in the top of the tank 18 and may be opened to admit air into the tank when the latter is being emptied. A pipe 22 extends into the tank 18 and supports a pressure reducing valve 23, of any of the well known types, whereby the pressure in the tank may be reduced and maintained at the lower degree regardless of the pressure entering the tank. A pipe 24 leads from the valve 23 through the top of the tank 13 and terminates near the bottom of said tank. The pressure thus admitted from the tank 18 into the tank 13 may be regulated by a valve 24ª located at a desirable position on the pipe 24.

In operation of the apparatus described to practice the invention the chemical reagent is introduced into the tank 13, and the pressure tank 18 is properly charged, the degree of pressure therein being regulated by the valve 23. The valve 24ª is then opened to admit pressure into the tank 13. The admission of pressure into the liquefied reagent causes agitation thereof to such an extent as to prevent crystallization and to maintain the same of uniform and unvarying density, and, at the same time, discharges a quantity of the heated reagent through the pipe 14 into the water distributing trough 6. The pressure thus admitted into the tank 13 overcomes the opposing pressure from the heater so that the required amount of the reagent will inevitably be supplied, assuming that the various valves are properly adjusted.

It is obvious that other mechanism may be utilized for the practice of this invention and process, and that there may be variations and alterations from the identical course outlined within equivalent limits without in the least departing from the spirit and scope of my invention.

What I claim and desire to secure by Letters Patent is:

1. The process of purifying water, consisting in circulating steam through an inclosure, subjecting a reagent to the heat within the inclosure, and causing the reagent and the water to be purified to flow together across mixing devices, substantially as described.

2. The process of purifying water, consisting in circulating steam through an inclosure, discharging water into the inclosure, heating a reagent to the temperature of the contents of the inclosure, and discharging the reagent into the water to be purified while the water is flowing.

3. The process herein described, consisting in placing a reagent inside of a water purifier, in applying the heat used in the purifier to said reagent and in simultaneously introducing water into said reagent, in thereby producing a hot chemical solution, and in introducing said solution while hot into the water to be purified.

4. The herein-described process, consisting in confining a reagent in a vessel extending in a water-purifier and subjected to the heat contained therein, in introducing a quantity of water into the reagent so situated, in conducting from the vessel the resulting solution in a heated state, and in introducing such solution into the water to be purified in advance of the purifying-pans of the purifier.

In testimony whereof, I hereunto affix my signature to this specification this 23rd day of February, 1907, in the presence of two witnesses.

JOHN E. ANGELL. [L. S.]

Witnesses:
J. D. RIPPEY,
CHARLES PICKLES.